(12) United States Patent
Hamelink et al.

(10) Patent No.: US 7,281,751 B2
(45) Date of Patent: Oct. 16, 2007

(54) SLIDING VISOR

(75) Inventors: L. Robert Hamelink, Hamilton, MI (US); Thomas S. Hodgson, Holland, MI (US); Kirk J. Olep, Hudsonville, MI (US); Brent D. Rockafellow, Holland, MI (US); Steven M. Spoerre, Holland, MI (US); Robert J. Stenman, Saugatuck, MI (US); Mathias R. Fox, Zeeland, MI (US); Kenneth D. Kreuze, Holland, MI (US); Jonathan B. Lubbers, Byron Center, MI (US); David L. Hiemstra, Hudsonville, MI (US); Jason R. Mulder, Zeeland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 7 days.

(21) Appl. No.: 10/529,828

(22) PCT Filed: Oct. 1, 2003

(86) PCT No.: PCT/US03/31130

§ 371 (c)(1),
(2), (4) Date: Oct. 17, 2005

(87) PCT Pub. No.: WO2004/030959

PCT Pub. Date: Apr. 15, 2004

(65) Prior Publication Data

US 2006/0202502 A1 Sep. 14, 2006

(51) Int. Cl.
*B60J 3/02* (2006.01)

(52) U.S. Cl. .................................................. 296/97.11
(58) Field of Classification Search ............. 296/97.11, 296/97.12
See application file for complete search history.

(56) References Cited

U.S. PATENT DOCUMENTS

| 2,207,668 A | 7/1940 | Hudgings, Jr. |
| 2,260,482 A | 10/1941 | Roberts |
| 2,284,784 A | 6/1942 | Westrope |
| 2,294,317 A | 8/1942 | Pelcher et al. |
| 2,322,898 A | 6/1943 | Van Dresser |
| 3,032,371 A | 5/1962 | Berridge et al. |
| 3,556,585 A | 1/1971 | Binder |
| 3,865,428 A | 2/1975 | Chester |
| 4,582,356 A | 4/1986 | Kaiser et al. |
| 4,828,313 A | 5/1989 | Lanser et al. |
| 4,925,233 A | 5/1990 | Clark |
| 4,998,765 A | 3/1991 | Van Order et al. |
| 5,004,288 A | 4/1991 | Viertel et al. |
| 5,044,687 A | 9/1991 | Abu-Shumays et al. |

(Continued)

FOREIGN PATENT DOCUMENTS

| DE | 3324305 | 1/1985 |
| JP | 5286362 | 11/1993 |

*Primary Examiner*—Dennis H. Pedder
(74) *Attorney, Agent, or Firm*—Price, Heneveld, Cooper, DeWitt & Litton, LLP (57) ABSTRACT

A visor (20) has a visor core (30,140) with a channel (36,100) for receiving a polymeric slide (54,130) fixedly coupled to a visor pivot rod (22) via a detent spring (56,120) to allow the visor to be adjustably moved along and rotated around the pivot rod.

38 Claims, 7 Drawing Sheets

U.S. PATENT DOCUMENTS

| | | |
|---|---|---|
| 5,161,850 A | 11/1992 | Redder et al. |
| 5,409,285 A | 4/1995 | Snyder et al. |
| 5,645,308 A | 7/1997 | Fink |
| 5,653,490 A | 8/1997 | Fink et al. |
| 5,765,899 A | 6/1998 | Watjer et al. |
| 6,131,985 A | 10/2000 | Twietmeyer et al. |
| 6,174,019 B1 | 1/2001 | Collet et al. |
| 6,474,717 B2 | 11/2002 | Viertel et al. |

SLIDING VISOR

BACKGROUND OF THE INVENTION

The present invention relates to sliding visors and particularly to an economical low profile sliding visor.

Numerous proposals for sliding visors exist in which the visor body slides over a visor rod utilizing some form of slide mechanism to provide a sliding interface between the body and the visor rod. U.S. Pat. Nos. 6,474,717; 6,174,019; 5,765,899; 5,653,490; 5,645,308; 5,409,285; 5,161,850; 5,004,288; 4,998,765; 4,925,233; and 4,582,356 are representative of different approaches employed in connection with such sliding visors. Many of the structures employed in sliding visor designs require a unique detent spring and large, frequently separate sliding mechanisms which extend within channels formed in the visor body to achieve the desired sliding action. As a result, sliding visors tend to be somewhat bulkier and expensive to manufacture.

Further, during use, some visors exhibit an uneven or uncontrolled sliding effort which worsens with age. Also, in some of the sliding visor configurations, it is necessary to provide a lubricious material, such as a silicone lubricant to the slide mechanism which lubricant can, if it seeps from the slide area, stain the upholstery material of the visor. There remains a need, therefore, for a sliding visor assembly which is relatively inexpensive and can be accommodated in a relatively thin, lightweight visor body and provides a controlled sliding force over the life of the visor.

SUMMARY OF THE INVENTION

The visor of the present invention solves these problems by providing a visor core with a channel for receiving a slide coupled to a pivot rod detent spring. In one embodiment, the channel has a fixed slide rod and a polymeric carrier slidably extends over the slide rod and is coupled to a visor rod and detent spring. The carrier, in a preferred embodiment of the invention, includes a spring-loaded friction control engaging the slide rod to allow the visor rod, detent spring, and carrier to move along the fixed slide rod in a controlled manner within a relatively thin channel formed in the visor core for adjusting the longitudinal position of the visor. In another embodiment, the channel is an elongated U-shaped spring mounted to the visor core and which slidably receives a polymeric slide couple to a tang of the detent spring.

These and other features, objects and advantages of the present invention will become apparent upon reading the following description thereof together with reference to the accompanying drawings.

DETAILED DESCRIPTION OF THE PREFERRED EMBODIMENT

Figure 1:
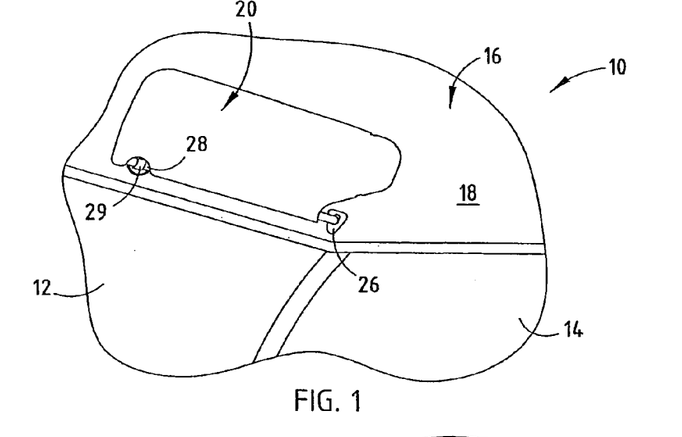
FIG. 1 is a fragmentary perspective view of a vehicle including a visor embodying the present invention, shown in a raised stored position against the vehicle headliner.
Figure 2:
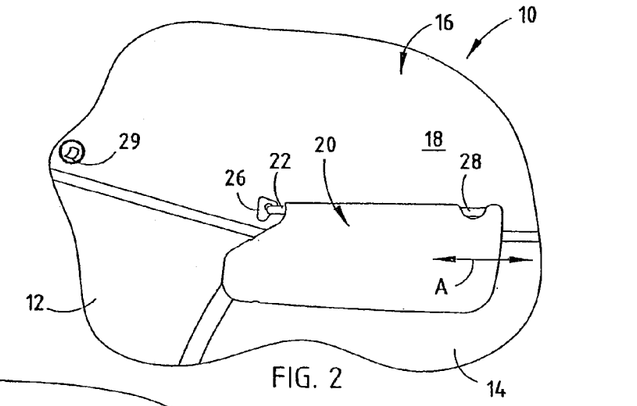
FIG. 2 is a fragmentary perspective view of the visor shown in FIG. 1, shown in a lowered first side window use position.
Figure 3:
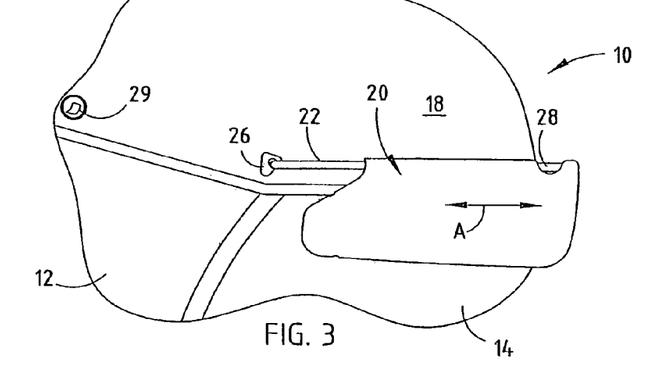
FIG. 3 is a fragmentary perspective view of the visor shown in FIG. 2, shown in a second use position in which the visor is extended.
Figure 4:
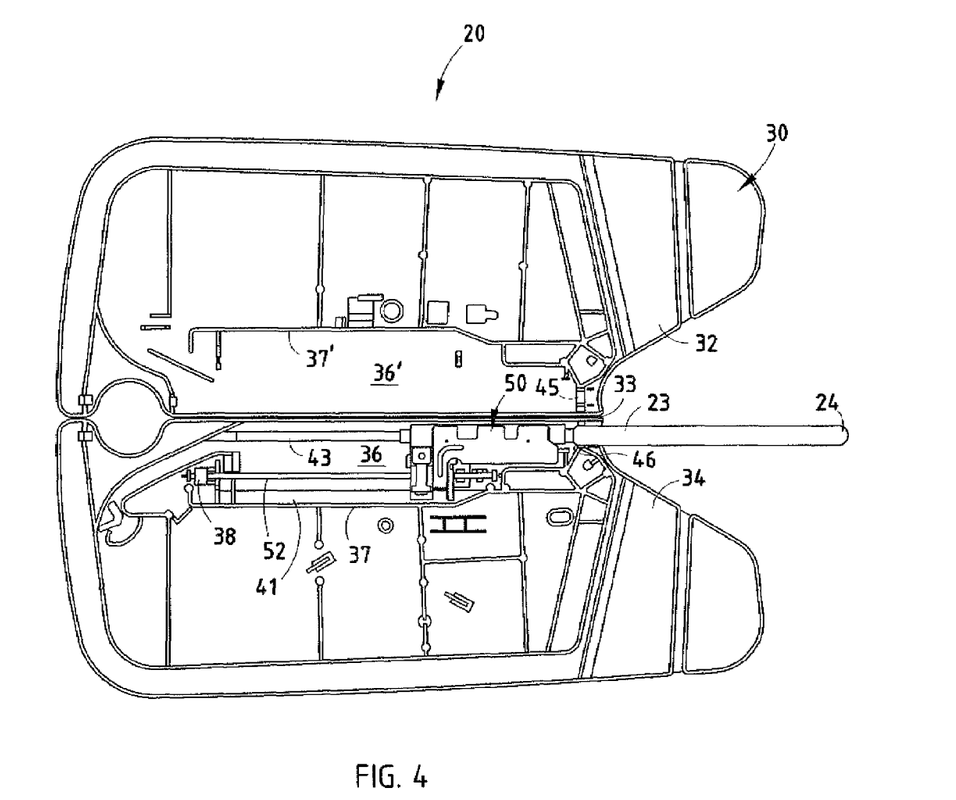
FIG. 4 is a plan view of the visor core, shown in an open position exposing the slide mechanism, shown in a visor extended position.
Figure 5:
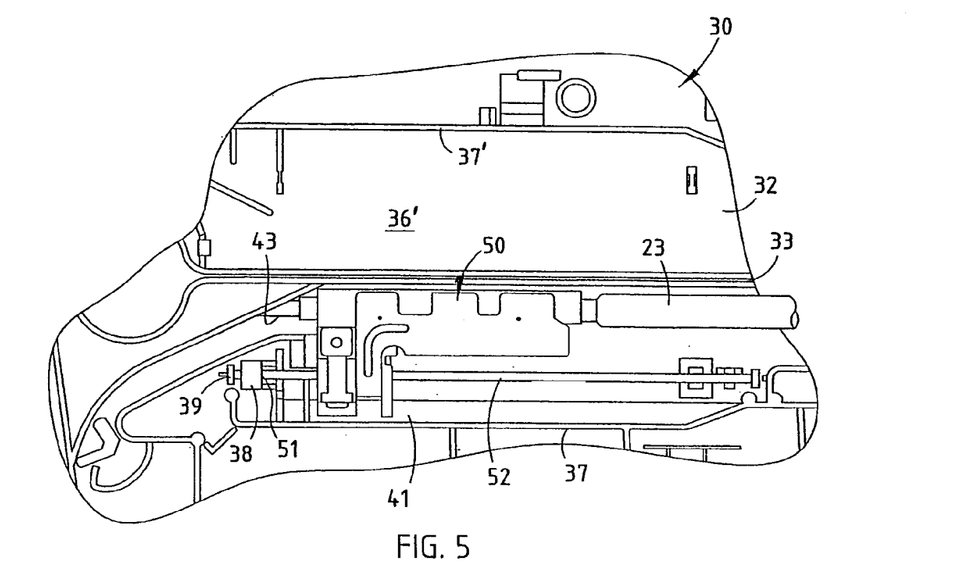
FIG. 5 is an enlarged fragmentary plan view of the slide mechanism and visor core shown in FIG. 4, shown with the visor body fully retracted.
Figure 7:
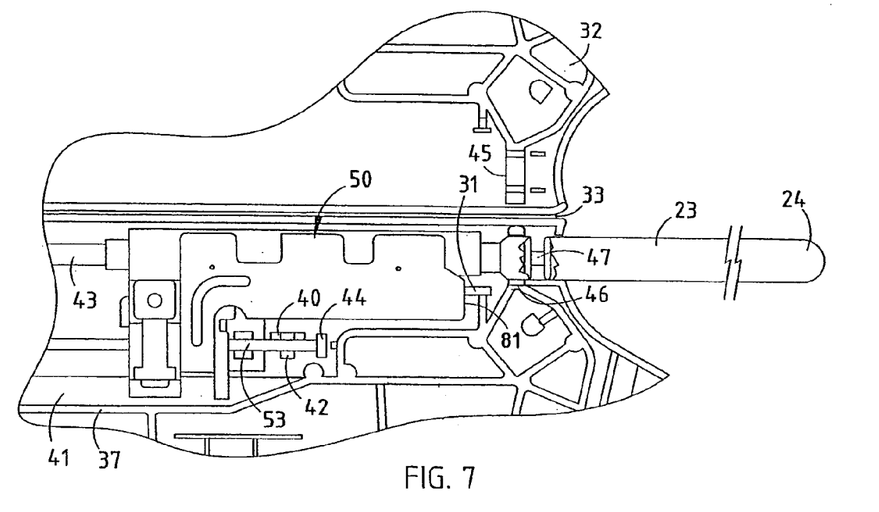
FIG. 7 is an enlarged fragmentary plan view of the slide mechanism and visor core, shown with the visor in the fully extended position.

Referring initially to FIGS. 1-3, there is shown a vehicle 10, such as an automobile, sport utility vehicle, van or the like, which has a windshield 12, a passenger right side window 14, and a structural top or roof typically covered by a headliner 16 having an upholstered surface 18 facing the interior of the vehicle. Mounted to the passenger side of the vehicle, as shown in the fragmentary perspective view of these figures, is a visor 20 which is secured to the roof of the vehicle by a conventional elbow mounting bracket 26 at one end and removably attached to the front of the vehicle, as shown in FIG. 1, at the opposite end by an auxiliary clip 28 which is removably received in socket 29. This allows visor 20 to be moved from a front window position, shown in FIG. 1, lowered to a sun-blocking position adjacent windshield 12 and pivoted to a side window position, as seen in FIGS. 2-3. Visor 20 is also slidable along visor pivot rod 22, as illustrated by arrow A in FIGS. 2 and 3. The visor rod 22, as best seen in FIGS. 4, 5, and 7, can be a hollow steel tube with alternately staggered flats 25 (FIG. 10) formed thereon for cooperating with a detent spring 56, as described below. Rod 22 includes an end with over-molded cladding 23 of a PBT resin, such as Valox®, which extends over the elbow 24 of the visor rod, which has an end extending within and secured to the conventional mounting bracket 26 to allow the pivoting of the visor from a front windshield position to the side window position. Although a passenger side visor installation 20 is shown in FIGS. 1-3, it is to be understood that a similar visor can be mounted to the driver's side of the vehicle.

Figure 10:
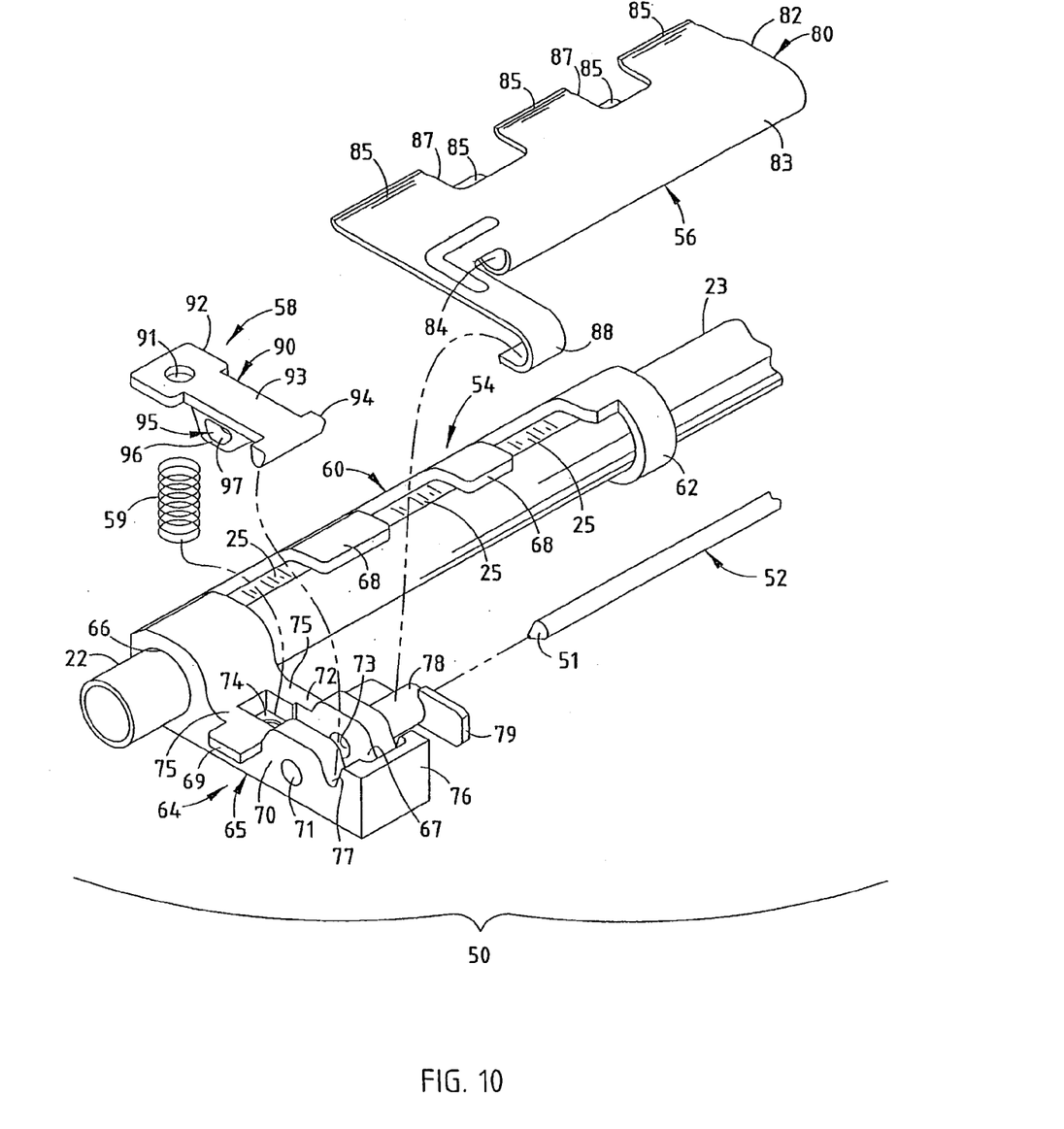
FIG. 10 is an enlarged exploded perspective view of the slide assembly shown in FIG. 9.

The visor 20 includes a visor core 30, as best seen in FIG. 4, which can be a butterfly-type core having a first core half 32 and a second core half 34 joined at a hinge 33. The core can be molded of a polymeric material, such as polypropylene, although it can also be fiberboard or made of other suitable materials. The core 30 is typically covered by an upholstery on the exterior surface with the core being folded over and joined together by snap-locking tabs, ultra sonic welding, or other conventional bonding methods to complete the visor. The visor core slidably receives the visor rod 22 and slide assembly 50 within a channel 36 formed in core half 34 by a wall 37 (FIG. 4) and a mating channel 36' and wall 37' in core half 32 for slidably receiving slide assembly 50. The slide assembly, as best seen in FIG. 10, includes a carrier 54, a slide rod friction control 58, a compression spring 59, and a detent spring 56 assembled onto slide rod 52 as described below. As seen in FIGS. 4 and 7, visor core halves 32 and 34 each include semicylindrical cradles 45 and 46, respectively, surrounding the over-molded end 23 of visor pivot rod 22 to guidably support the edge of the visor as it is adjustably positioned along the visor rod.

Fixedly mounted to visor core 30 is a slide rod 52, which has one end 51 captively held within an integrally formed socket 38 (FIGS. 4, 5 and 10) and abuts against stop 39. The opposite end 53 of rod 52 extends into a cradle 40 (FIGS. 4-7) and an opposite end 53 which snap fits within open socket 42 adjacent cradle 40 and abuts end stop 44. Thus, slide rod 52 is fixedly mounted within the visor core half 34 in parallel spaced relationship to wall 37 and within channel 36, which is defined, in part, by a mating channel 36' and wall 37' in core half 32 when the visor core halves 32 and 34 are closed upon completion of assembly of the visor. Channel 36, 36' is a longitudinally extending channel defined by core halves 32, 34 spaced-apart when the visor is assembled sufficiently so that slide assembly 50 can slide within the channel 36, 36' with carrier 54 engaging a raised guide rail 41 (FIGS. 4-7) extending adjacent wall 37 from the floor of channel 36. A second guide rail 43 (FIGS. 4-7) extends upwardly from the floor of channel 36 (i.e., inwardly from the core half 34) and is axially aligned with visor rod 22. Rails 41 and 43 engage the carrier 54 at the top of channel 36 (near hinge 33) and adjacent wall 37 to provide, together with friction control 58 and a visor rod engaging tab 47 (FIG. 7), the desired frictional control to provide the controlled sliding movement of the visor.

Figure 9:
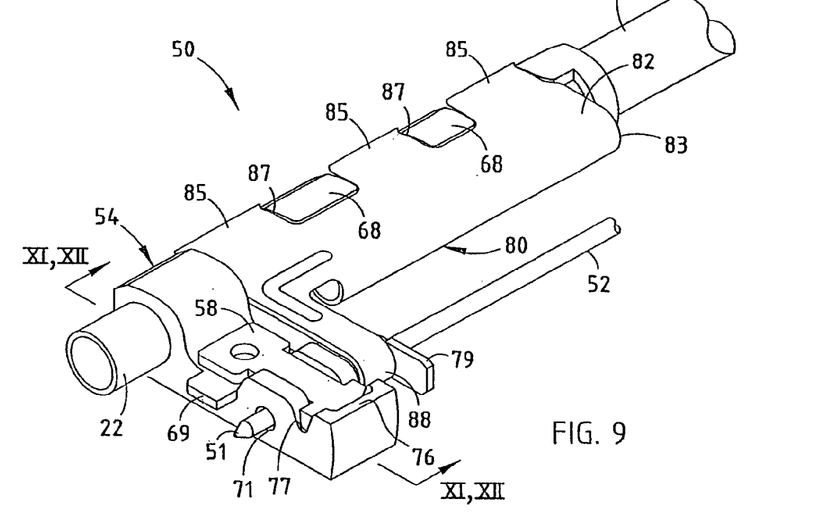
FIG. 9 is an enlarged fragmentary perspective view of the slide assembly of the present invention.

The slide assembly 50 comprises, as best seen in FIGS. 9 and 10, the integrally molded carrier 54 and a detent spring 56, which are axially fixed on visor rod 22 and move along slide rod 52, as illustrated in FIGS. 4 and 5, between a left endmost position when the visor is retracted (FIGS. 1 and 2) to a right endmost position when the visor is extended, as seen in FIGS. 3 and 7. The carrier is attached to the visor rod 22 by the surrounding detent spring 56 which engages flats 25 on the visor rod for axially fixing the slide assembly 50 so-formed to the visor rod 22. The carrier 54 and friction control 58, together with the guide rails 41 and 43 and tab 47, allow the controlled sliding movement of the visor core and fixed slide rod 52 with respect to the visor rod 22 by controlling the movement of slide 50 and visor rod 22 within channel 36. Carrier 54 includes a laterally extending tang 69 (FIGS. 6, 9, and 10) for docking the carrier in the visor retracted position as described below. The relatively compact slide assembly 50 is now described in greater detail, particularly with reference to FIGS. 9 and 10.

The carrier 54 includes an integrally molded polymeric body 60 having a collar 62 at its right end (as viewed in FIGS. 9 and 10) which receives visor pivot rod 22 therein. The opposite end of body 60 includes a downwardly depending tang 64 with an aperture 66 coaxially aligned with collar 62 for supporting the end of visor pivot rod 22. Tang 64 includes a leg 65 with a recess 67 for receiving friction control 58 and compression spring 59. Leg 65 includes a pair of spaced-apart walls 70 and 72, a floor 74, and an end wall 76 defining the recess for receiving friction control 58. Walls 70 and 72 include a pair of apertures 71 and 73 in axially aligned relationship. Aperture 73 extends through laterally extending cylindrical mounting boss 78 integrally formed with leg 72. Boss 78 has an outer flange 79 thereon for captively holding the hook 88 of the torque clip 56. Leg 65 also includes a pair of shoulders 75 for supporting, as described below, the tab 92 of friction control 58 thereon. Leg 65 also includes a semicylindrical socket 77 for receiving the pivot axle 94 of friction control 58.

The detent spring 56 extends over pivot rod 22 and carrier 54 and includes a generally U-shaped body 80 with legs 82 and 84 integrally joined at curved end 83. Each of the legs include spaced-apart tangs 85, which are alternately staggered with respect to the other leg and engage alternately staggered flats 25 on pivot rod 22 (FIG. 10). Spring 56 can generally be of the type disclosed in U.S. Pat. No. 4,828,313 and is made of spring steel suitably treated for the automotive environment. The spring, however, has a hook 88 at an end which fits over boss 78 and is captively held between wall 72 and flange 79 of carrier 54, as illustrated in FIG. 9. The mounting of detent spring on carrier 54 axially locks the slide assembly 50 to pivot rod 22 upon assembly. The carrier 54 is integrally molded of a suitable polymeric material, such as acetal, and includes pairs of spaced grease guards 68, which extend within slots 87 between tangs 85 of the detent spring 56 to retain any lubrication which may be employed between detent spring 56 and the metal pivot rod 22. This prevents or, at least, greatly reduces seepage of lubrication from the detent spring and pivot rod into the visor interior.

Figure 11:
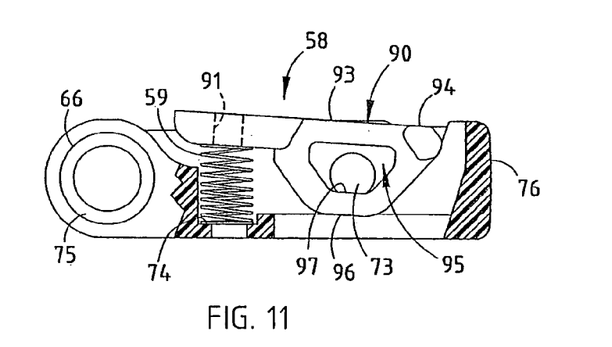
FIG. 11 is a cross-sectional view of the slide assembly shown in FIG. 9 prior to assembly onto the slide rod, taken along section lines XI-XI of FIG. 9.
Figure 12:
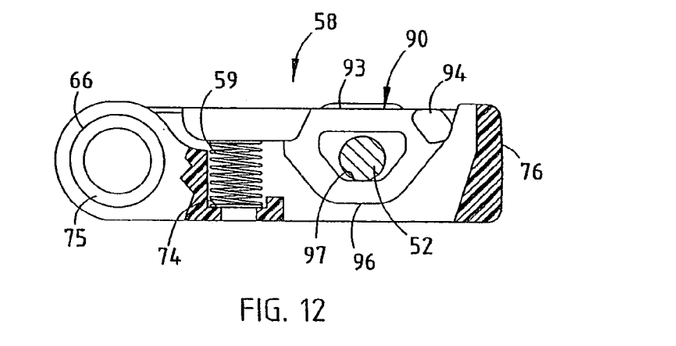
FIG. 12 is a cross-sectional view of the slide assembly shown in FIG. 9, taken along section lines XII-XII in FIG. 9, after assembly of the slide mechanism to the slide rod.

Friction control 58 includes a body 90, also integrally molded of a suitable polymeric material such as acetal, and includes a tab 92 at one end with a centering cylindrical projection 91 fitting within one end of coil spring 59. Tab 92 rests on shoulders 75 of carrier walls 70 and 72. Body 90 of control 58 includes an upper leg 93 extending from tab 92 to a pivot axle 94 at the opposite end, which axle rests within semicylindrical socket 77 formed in carrier walls 70 and 72 adjacent end wall 76. A second leg 96 extends from tab 92 to axle 94 in spaced relationship to leg 93 to define an aperture 95 through which slide rod 52 extends (FIGS. 9, 11, and 12). Leg 96 has an interior surface 97 which engages rod 52 with a constant pressure applied by the force of spring 59 urging control 58 in a clockwise direction (as viewed in FIGS. 11 and 12) about axle 94 to maintain a constant sliding friction for visor slide assembly 50 with respect to rod 52. The spring constant "k" of spring 59 is selected to provide, depending on the visor size, the desired sliding effect. In one embodiment, spring 59 had a spring constant of about 2.195 N/mm to provide a sliding effort of 13.5 N. The sliding effort is also achieved by guides 41 and 43 on core half 34, which extend in parallel relationship to slide rod 56 and underlie and engage carrier tang 64. Tab 47 and cradles 45, 46 also slidably engage overcladding 23 of visor pivot rod 22 and contribute to the sliding effort of visor 20 as well as reducing BSR (buzz, squeak, and rattle) of the visor.

As seen in FIGS. 11 and 12 during assembly, the friction control 58 and coil spring 59 are pressed into recess 57 of carrier 54, while rod 52 is inserted through apertures 73, 95 and 71 to captively hold the otherwise floating friction control 58 to carrier 54. This assembly typically takes place after the detent spring and carrier have been mounted to pivot rod 22. This subassembly, as seen in FIG. 9, is then inserted into the visor core by tipping end 51 of slide rod 52 and inserting it into socket 38 and snap-fitting the opposite end 53 of rod 52 in collar 40 and snap-fit socket 42. The rod 52 is then held in fixed relationship with respect to visor core 30 between end stops 39 and 44.

Figure 6:
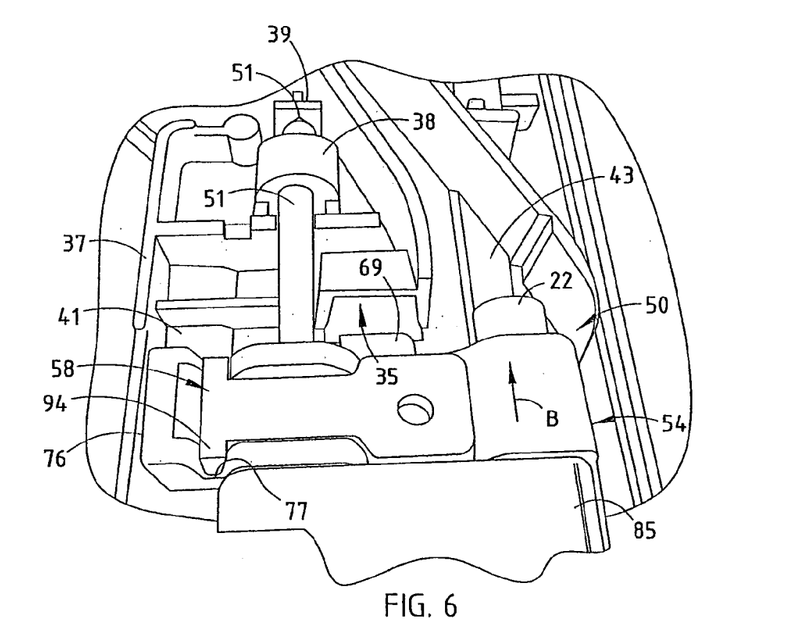
FIG. 6 is an enlarged fragmentary perspective view of the visor slide mechanism as it approaches the visor retracted position.

To improve the stability of the visor slide mechanism as the visor is pivoted between a lowered use position and a raised stored position, the slide assembly and core include a docking feature at each end to positively lock the slide assembly 50 to the visor core. As seen in FIG. 6 on the left end of channel 36, there is provided a socket 35 which receives the laterally extending docking tab 69 of carrier 54 therein, such that, when the visor is fully retracted as shown in FIG. 5, slide assembly 50 is positively locked to the visor core against rotation due to the close interference fit between the docking tab 69 and mating socket 35. This feature significantly reduces the forces otherwise placed upon the side walls of channel 36 of the visor core during the normal raising and lowering motion of the visor when in a front windshield position.

Figure 8:
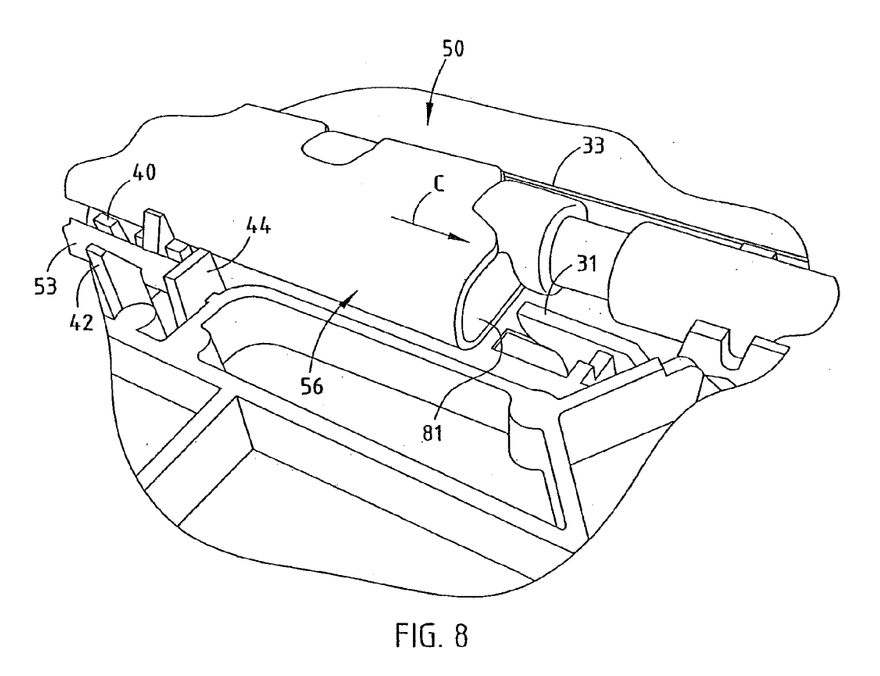
FIG. 8 is an enlarged fragmentary perspective view of the slide mechanism as it approaches the visor fully extended position.

When fully extended, the slide assembly 50 is also locked to the visor core by a tapered hook 31 (FIG. 8) which extends within an opening 81 of detent spring 56 when the slide assembly 50 is moved in the direction indicated by arrow C in FIG. 11 to a fully extended position, as seen in FIG. 7. This docking feature also provides rigidity to the interface between the visor pivot rod 22 and visor core 30 for pivoting of the visor from a lowered position to raised position if fully extended, as seen in FIG. 3.

By the use of a fixed slide rod 52, typically made of steel or other thermally stable material, and the use of a spring-loaded friction control 58 and carrier 54 which accommodate detent spring 56, a compact relatively thin profile slide assembly is provided which is coupled at only one end to the slide rod, thereby greatly reducing the overall bulk of the slide assembly permitting a relatively small profile visor to accommodate the sliding motion desired for improved sun-blocking protection. The use of the spring-loaded friction control 58, which provides a major portion of the sliding effort, allows the selected sliding friction to remain relatively constant over the life of the visor.

Figure 13:
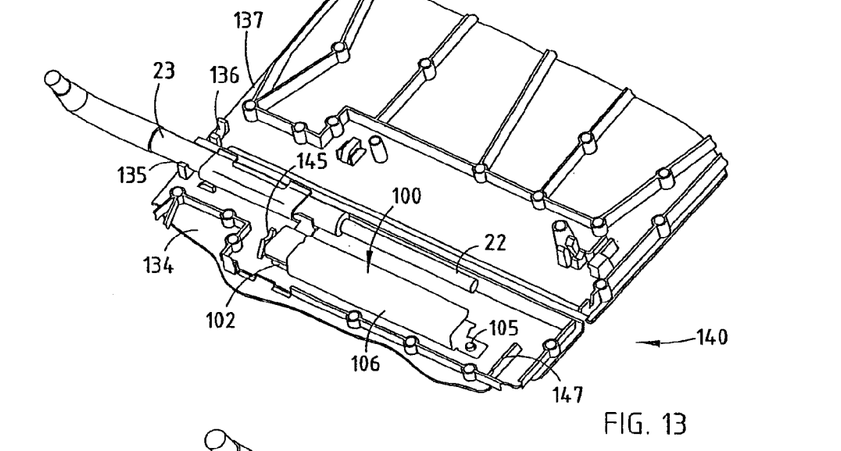
FIG. 13 is a fragmentary perspective view of an alternative embodiment of the present invention.
Figure 14:
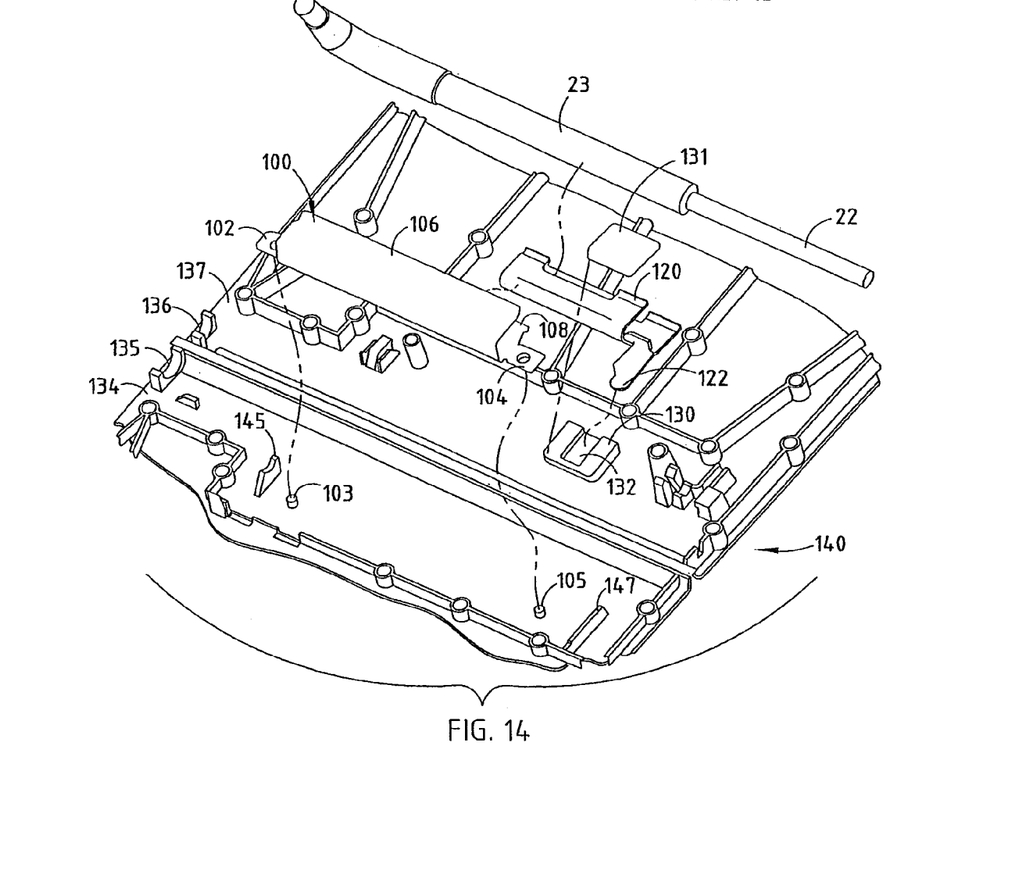
FIG. 14 is an exploded fragmentary perspective view of the alternative embodiment shown in FIG. 13.

In an alternative embodiment of the invention as seen in FIGS. 13 and 14, the same pivot rod 22 with overcladding 23 receives a detent spring 120 generally of the type described in U.S. Pat. No. 4,828,313. Spring 120 has a downwardly depending tang 122 to which there is fitted a polymeric slide 130 having a pocket 132 for captively receiving tang 122. A cover cap 131 is bonded to slide 130 to encapsulate tang 122.

Slide 130 slidably extends within a generally U-shaped steel channel 100, which is fixedly attached to core half 134 of visor core 140 of a visor. A pair of outwardly extending mounting flanges 102 and 104 fit over polymeric posts 103 and 105, respectively, which can then be heat staked to captively, fixedly hold channel 100 to the visor core half 134. Channel 100 is, thus, mounted in relationship to the pivot rod 22 such that slide 130 extends within channel 100. The pivot rod overcladding 23 nests within semicylindrical cradles 135 and 136 on visor core halves 134 and 137, respectively, to allow the visor core 140 to) slide with respect to pivot rod 23 by the axially fixed detent spring 120 with the sliding interface control being provided by polymeric slide 130 sliding within the U-shaped channel 100. The channel 100 is made of spring steel with walls 106, 108 positioned with respect to one another a distance which is selected to provide the desired compressive force against slide 130 to provide the desired sliding resistance for visor body 140. The depth of recess 132 receiving tang 122 is such that only the lubricious polymeric surfaces of slide 130 engage the inner surfaces of walls 106, 108 of channel 100. Slide 130 may be molded onto tang 122, if desired. Stops 145 and 147 extend at opposite ends of channel 100 to captively hold slide 130 within channel 100 between the desired excursion limits for the sliding visor. The channel wall spacing with respect to the thickness of slide 130 is selected to provide the same or similar sliding effort as in the first embodiment. Slide 130 can be molded of a suitable polymeric material, such as acetal.

Thus, in the alternate embodiment, another form of a compact economical slide mechanism is provided to allow a visor to be slidably mounted, as illustrated in FIGS. 1-3, to a vehicle for providing adjustable sun-blocking protection. Typically, the sliding motion will be employed at the slide window position, as illustrated in FIGS. 2 and 3, although, upon unclipping of the visor from the front windshield position, the visor likewise can be adjustably positioned toward and away from the rearview mirror when in a front windshield position as well. In both embodiments of the invention, the detent spring is integrally associated with a carrier, such as carrier 54 in the first embodiment or equivalent carrier compressing slide 130 in the second embodiment, and fits within a channel which is in fixed relationship to the visor body for providing the desired sliding control of the visor with respect to the visor pivot rod.

The slide assembly 50, including slide rod 52 and channel 36, can be incorporated into other vehicle accessories or environments other than vehicles to provide a controlled sliding motion between a first member and a second member. It will become apparent to those skilled in the art that various modifications to the preferred embodiments of the invention as described herein can be made without departing from the spirit or scope of the invention as defined by the appended claims.

The invention claimed is:

1. A sliding visor comprising:
    a visor body including a channel for receiving a slide assembly therein;
    a slide rod fixedly positioned within said channel;
    a visor pivot rod; and
    a slide assembly including a carrier for receiving a detent spring, said slide assembly axially fixed to said visor pivot rod and extending within said channel, wherein said carrier includes at least one aperture for receiving said slide rod to control the movement of said visor body in an axial direction with respect to said visor pivot rod.

2. The visor as defined in claim 1 wherein said carrier includes a body coupled to said visor pivot rod and a leg extending from one end of said body toward said slide rod and including said at least one aperture and a spring-loaded friction control coupled to said leg for engaging said slide rod.

3. The visor as defined in claim 2 wherein said slide assembly includes a detent spring with alternately staggered tangs engaging said visor pivot rod and said carrier includes alternately staggered tabs extending within slots formed between said tangs in said detent spring.

4. The visor as defined in claim 3 wherein said body of said carrier includes a first collar at one end remote from said leg and wherein said first collar surrounds said visor pivot rod.

5. The visor as defined in claim 4 wherein said leg includes a lateral extension and flange defining a slot and wherein said detent spring includes a hook extending within said slot.

6. The visor as defined in claim 5 wherein said body includes a second collar adjacent said leg and surrounding said visor pivot rod.

7. The visor as defined in claim 6 wherein said leg includes a recess including a socket for pivotally receiving said friction control.

8. The visor as defined in claim 7 wherein said friction control includes an aperture through which said slide rod extends and further including a spring for urging a side wall of said aperture of said friction control against said slide rod.

9. A visor control comprising:
a visor pivot rod having spaced-apart flats formed thereon;
a carrier for receiving a detent spring; and
a detent spring with alternately staggered tangs engaging said flats of said visor pivot rod to control the raised and lowered position of a visor coupled to said pivot rod, wherein said carrier includes alternately staggered tabs extending within slots formed between said tangs in said detent spring.

10. The visor control as defined in claim 9 wherein said body of said carrier includes a first collar at one end which surrounds said visor pivot rod.

11. The visor control as defined in claim 10 wherein said carrier includes a leg having a lateral extension and flange defining a slot and wherein said detent spring includes a hook extending within said slot.

12. The visor control as defined in claim 11 wherein said leg includes a second collar spaced from said first collar and surrounding said visor pivot rod.

13. A sliding control for mounting a vehicle accessory to a vehicle comprising:
a vehicle accessory having a body including a channel for receiving a slide assembly therein;
a slide rod fixedly positioned within said channel;
a mounting rod for coupling to a vehicle and movably receiving said body; and
a slide assembly including a carrier coupled to said mounting rod and extending within said channel, wherein said carrier includes at least one aperture for receiving said slide rod to control the movement of said visor body in an axial direction with respect to said visor pivot rod.

14. The sliding control as defined in claim 13 wherein said carrier includes a body coupled to said mounting rod and a leg extending from one end of said body toward said slide rod and including said at least one aperture receiving said slide rod and a spring-loaded friction control coupled to said leg for engaging said slide rod.

15. The sliding control as defined in claim 14 wherein said leg includes a recess including a socket for pivotally receiving said friction control.

16. The sliding control as defined in claim 15 wherein said friction control includes an aperture through which said slide rod extends and further including a spring for urging a side wall of said aperture of said friction control against said slide rod.

17. The sliding control as defined in claim 16 wherein said body of said carrier includes a first collar at one end remote from said leg which surrounds said mounting rod.

18. The sliding control as defined in claim 17 wherein said body includes a second collar adjacent said leg and surrounding said mounting rod.

19. A sliding visor comprising:
a visor body including a channel for receiving a slide therein;
a visor pivot rod;
a slide; and
a detent spring axially fixed to said visor pivot rod and coupled to said slide wherein said slide extends within said channel to control movement of said visor body in an axial direction with respect to said visor pivot rod and wherein said detent spring comprises a generally U-shaped spring steel member fixedly mounted to said slide, and wherein said detent spring includes a tang extending therefrom and said slide is mounted to said tang.

20. The sliding visor as defined in claim 19 wherein said slide comprises a polymeric member integrally molded onto said tang.

21. The sliding visor as defined in claim 20 and further including a slide rod fixedly mounted within said channel.

22. The sliding visor as defined in claim 21 wherein said slide includes a carrier having a body coupled to said visor pivot rod and a leg extending from one end of said body toward said slide rod and including said at least one aperture and a spring-loaded friction control coupled to said leg for engaging said slide rod.

23. The sliding visor as defined in claim 22 wherein said detent spring includes alternately staggered tangs engaging said visor pivot rod and said carrier includes alternately staggered tabs extending within slots formed between said tangs in said detent spring.

24. The sliding visor as defined in claim 23 wherein said leg of said carrier includes a lateral extension and flange defining a slot and wherein said detent spring includes a hook extending within said slot.

25. The sliding visor as defined in claim 24 wherein said body of said carrier includes first and second spaced-apart collars surrounding said visor pivot rod.

26. A sliding visor comprising:
a visor body including a channel for receiving a slide therein;
a visor pivot rod;
a slide, wherein said slide includes a leg and a friction control member, wherein said friction control member is pivotally mounted to said leg; and
a detent spring axially fixed to said visor pivot rod and coupled to said slide wherein said slide extends within said channel to control movement of said visor body in an axial direction with respect to said visor pivot rod and wherein said visor includes a slide rod mounted within said channel and said friction control member includes an aperture through which said slide rod extends and further including a spring extending between said slide and said friction control member for urging a side wall of said aperture of said friction control member against said slide rod.

27. The sliding visor as defined in claim 26 wherein said slide includes a socket and said friction control member includes a pivot axle for pivotally coupling said friction control member to said socket.

28. The sliding visor as defined in claim 27 wherein said slide includes apertures extending on opposite sides of said friction control member for receiving said slide rod thereon and said friction control member is captively held to said slide by the extension of said slide rod through said slide and said friction control member.

29. A sliding visor comprising:
a visor body including a channel for receiving a slide assembly therein;
a slide rod fixedly positioned within said channel;
a visor pivot rod; and
a slide for receiving a detent spring, said slide axially fixed to said visor pivot rod and extending within said channel, wherein said slide includes at least one aperture for receiving said slide rod to control the movement of said visor body in an axial direction with respect to said visor pivot rod and a spring-loaded friction control coupled to said slide for engaging said slide rod.

30. The sliding visor as defined in claim 29 wherein said visor body includes at least one rail formed in said channel for engaging said slide.

31. The sliding visor as defined in claim 29 wherein said visor body includes a socket surrounding said visor pivot rod and a tang engaging said visor pivot rod adjacent said socket.

32. The sliding visor as defined in claim 31 wherein said slide includes a socket and said friction control member includes a pivot axle for pivotally coupling said friction control member to said socket.

33. The sliding visor as defined in claim 32 wherein said slide includes apertures extending on opposite sides of said friction control member for receiving said slide rod thereon and said friction control member is captively held to said slide by the extension of said slide rod through said slide and said friction control member.

34. A sliding visor comprising:
a visor body including a channel for receiving a slide assembly therein;
a slide rod fixedly positioned within said channel;
a visor pivot rod including at least one flat formed thereon; and
a slide assembly including a carrier for receiving a detent spring, said slide assembly coupled to said visor pivot rod such that said detent spring selectively engages said flat, and wherein one of said carrier and visor body includes a tab extending therefrom and wherein the other of said carrier and said visor body includes a socket for receiving said tab when said visor body is in a predetermined position with respect to said visor rod.

35. The visor as defined in claim 34 wherein said predetermined position is when said visor body is in a retracted position.

36. The visor as defined in claim 35 wherein said predetermined position is when said visor body is in a fully retracted position.

37. The visor as defined in claim 34 wherein said tab engages said socket in a close interference fit.

38. The visor as defined in claim 34 wherein said carrier is releasably locked to said visor body when said visor body is in said predetermined position.

* * * * *